United States Patent [19]

Matsuo

[11] Patent Number: 5,714,173
[45] Date of Patent: Feb. 3, 1998

[54] SYNTHETIC RESIN GRANULATING DIE

[75] Inventor: Toshio Matsuo, Hiroshima, Japan

[73] Assignee: The Japan Steel Works, Ltd., Tokyo, Japan

[21] Appl. No.: 649,440

[22] Filed: May 17, 1996

[51] Int. Cl.⁶ .............................. B29B 9/06; B29C 47/30; B29C 47/86
[52] U.S. Cl. ........................... 425/67; 425/313; 425/464
[58] Field of Search .......................... 425/67, 311, 313, 425/461, 464, DIG. 230

[56] References Cited

U.S. PATENT DOCUMENTS

| | | | |
|---|---|---|---|
| 3,516,120 | 6/1970 | Braun et al. | 425/67 |
| 3,559,286 | 2/1971 | Karet | 425/464 |
| 3,749,536 | 7/1973 | Remscheid et al. | 425/464 |
| 4,187,067 | 2/1980 | Mizuno et al. | 425/313 |
| 4,720,251 | 1/1988 | Mallay et al. | 425/67 |
| 4,752,196 | 6/1988 | Wolfe, Jr. | 425/313 |
| 4,764,100 | 8/1988 | Lambertus | 425/67 |

FOREIGN PATENT DOCUMENTS

WO-8101980  7/1981  WIPO ............................ 425/67

*Primary Examiner*—Robert Davis
*Attorney, Agent, or Firm*—Sughrue, Mion, Zinn, Macpeak & Seas, PLLC

[57] ABSTRACT

In a granulating die for synthetic resin, including: a plurality of nozzle holes formed in rows; a plurality of heating jackets each arranged between the rows; and a plurality of vacuum heat insulating portions formed on a surface of the granulating die, each of the vacuum heat insulating portions being arranged adjacently to one of the heating jackets, the granulating die provides the nozzle holes which are prevented from being cooled excessively by circulating water to eliminate choking of the nozzle holes to make it possible to obtain good pellets.

4 Claims, 3 Drawing Sheets

SYNTHETIC RESIN GRANULATING DIE

BACKGROUND OF THE INVENTION

The present invention relates to granulating dies for synthetic resin and a method of producing the same.

FIG. 3 is a frontal sectional view showing a main part of an underwater granulator used hitherto. In FIG. 3, an underwater cutting device 32 is attached to a granulating die 1 which has a large number of nozzle holes 2 and are mounted to an end of an extruder 30 through a die holder 31. The underwater cutting device 32 includes a circulator box 33 for circulating water (cooling water or hot water), a large number of cutter edges 34 provided adjacently to a surface of the granulating die 1, and a drive portion 36 for rotating the large number of cutter edges 34 through a cutter shaft 35.

In the aforementioned underwater granulator 32, melted resin from the extruder 30 passes through the die holder 31. The melted resin is extruded into the circulator box 33 while it is formed into columns through the nozzle holes 2 of the granulating die 1. The melted resin columns are cooled and then solidified immediately by the circulating water. The solidified resin is cut into a moderate length by the cutter edges 34 to be in the form of pellets 37 which are carried to a pellet dewatering/drying device (not shown) by the circulating water.

Because the surface of the granulating die 1 is always cooled by the circulating water, the melted resin columns may be solidified in the nozzle holes 2 to cause so-called choking. Such granulating die 1 as shown in FIGS. 4 and 5 are used in order to prevent this choking. That is, as shown in each of FIGS. 4 and 5, a large number of nozzle holes 2 are formed so as to pierce the granulating die 1 in the direction of the thickness of the granulating die 1, and each of the nozzle holes 2 has land portions 38 and a tapered portion 39. The land portions 38 includes a large diameter portion formed at the melted resin inlet side and a small diameter portion formed at the melted resin outlet side, and the tapered portions 39 is interposed between these portions of the land portions 38. Further, a curing layer 40 is provided on the surface of the granulating die 1. At least one heating jacket 3 is formed near the nozzle holes 2 so that the nozzle holes 2 are heated by a heating fluid such as steam or the like, which is supplied to the jacket 3, to prevent the choking of the melted resin. The granulating die 1 shown in FIG. 4 is designed so that heating jackets 3 are formed on the opposite sides of each nozzle hole 2. On the other hand, the granulating die 1 shown in FIG. 5 is designed so that the nozzle holes 2 are formed in a large number of nozzle pipes 41 respectively and a heating jacket 3 is formed in common to the nozzle pipes 41. The nozzle pipes 41 are inserted in the granulating die 1 in the direction of the thickness of the granulating die 1 and welded to be integrated with the granulating die 1.

Recently, with the advance of diversification of synthetic resin, resin of very high viscosity (low MI) grade and, contrariwise and resin of very low viscosity (high MI) grade are produced. Because the former is poor in fluidity and because the latter requires low-temperature or chilled circulating water in order to improve the shape of pellets, the conventional granulating die have a problem that choking occurs easily. On the other hand, a method of joining a heat insulating member to a granulating die is used in practice. In this method, however there is a problem that reliability on the joint portion is low because the heat insulating member is quite different in material quality from the granulating die.

SUMMARY OF THE INVENTION

The present invention has been achieved to solve conventional problems and it is an object thereof to provide a synthetic resin granulating die in which nozzle holes are prevented from being cooled excessively by circulating water to thereby eliminate choking of the nozzle holes to make it possible to obtain good pellets, and to provide a method of producing such a die.

According to a first aspect of the present invention, the above object is attained by a granulating die for synthetic resin, providing: a plurality of nozzle holes formed in rows; a plurality of heating jackets each arranged between the rows; and a plurality of vacuum heat insulating portions formed on a surface of the granulating die, each of the vacuum heat insulating portions being arranged adjacently to one of the heating jackets.

Preferably, in the above granulating die, the jackets and the vacuum heat insulating portions are provided linearly.

According to a second aspect of the present invention, an underwater granulator includes the granulating die according to the first aspect of the invention.

According to a further aspect of the present invention, the above object is attained by a method of producing a granulating die for synthetic resin, providing the steps of: forming a first linear groove in a surface portion of a mother material; forming a second linear groove adjacently to the first linear groove in the surface portion of the mother material; putting a first filler metal in an upper portion of the first linear groove for forming a heating jacket; putting a second filler metal in the second linear groove at a predetermined clearance away from the first filler metal; electron-beam-welding the second filler metal to the mother material in a vacuum state for forming a closed vacuum heat insulating portion; and forming nozzle holes through the mother material between the heating jacket and the vacuum heat insulating portion.

Thus, the grooves are formed in the upper portions of the heating jackets formed in the granulating die, the filler metals are put in the linear grooves while securing gaps for vacuum portions respectively, and the filler metals are electron-beam welded to a mother material of the granulating die in a vacuum chamber so that closed vacuum heat insulating portions are formed near the surface of the granulating die. Because the electron-beam welding is performed in a high vacuum, a state of high vacuum ($5\times10^{-3}$ torr or less) is obtained in each of the vacuum heat insulating portions.

DESCRIPTION OF THE PREFERRED EMBODIMENT

An embodiment of the present invention will be described with reference to the drawings.

Figure 2:
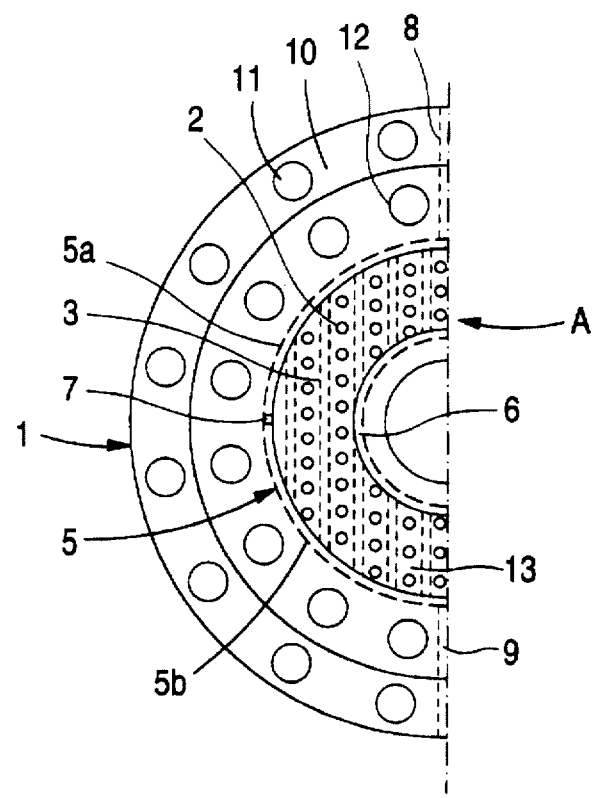
FIG. 2 is a plan view showing a left-half of the granulating die of the embodiment.
Figure 3:
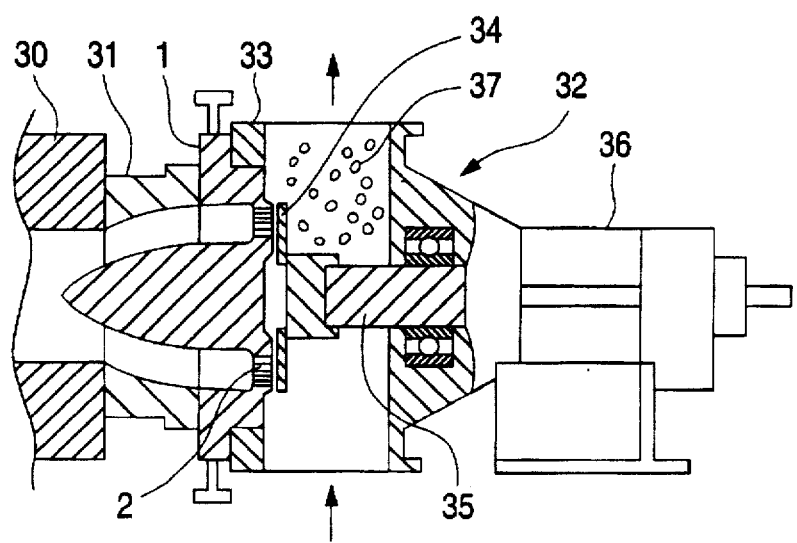
FIG. 3 is a frontal sectional view of main part of an underwater granulator.
Figure 4:
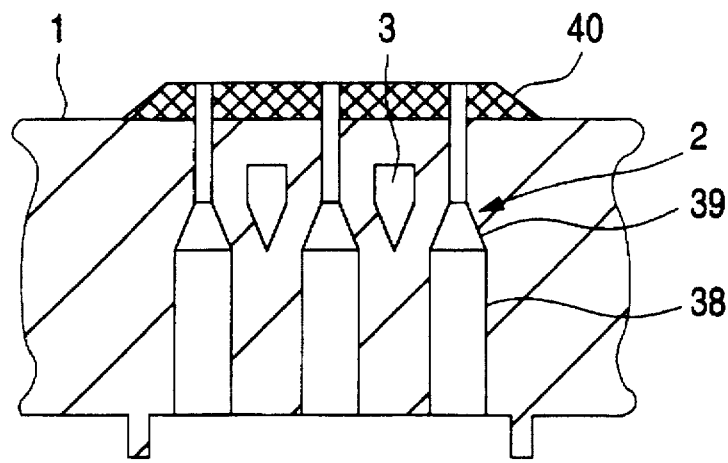
FIG. 4 is a sectional view of main part of a conventional granulating die.
Figure 5:
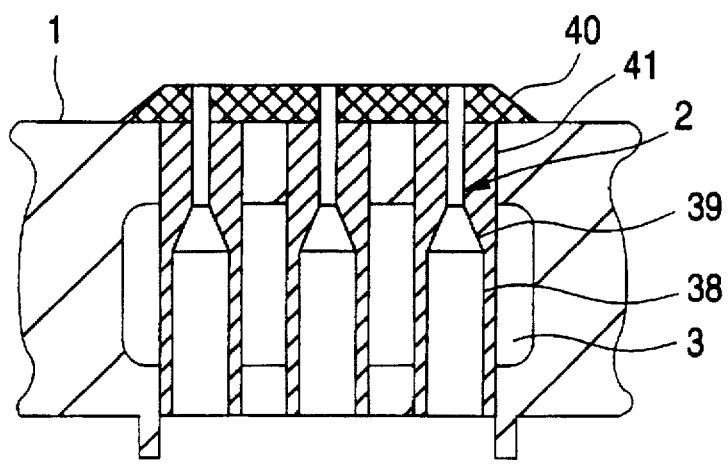
FIG. 5 is a sectional view of main part of another conventional granulating die.

As shown in FIG. 2, an outer annular path 5 and an inner annular path 6 are provided in the granulating die 1. A large number of heating jackets 3 are provided between the paths 5 and 6 in parallel with each other. The outer annular path 5 is divided into two, upper and lower portions 5a and 5b by blocks 7 provided in the left and right side, in the drawing, of the granulating die 1, respectively. A heating fluid inlet path 8 and a heating fluid outlet path 9 are provided so as to respectively communicate with the upper and lower portions 5a and 5b of the outer annular path 5. Nozzle holes 2 are provided between the heating jackets 3 arranged in parallel with each other. Alternatively, the heating jackets 3 may be provided radially and the nozzle holes 2 may be provided radially between the heating jackets.

A curing layer 40 is provided in the surface of the granulating die 1. A flange 10 is provided in the circumference of the granulating die 1, and bolt holes 11 for mounting a circulator box 33 and bolt holes 12 for mounting the granulating die 1 are formed in the flange 10.

Figure 1A:
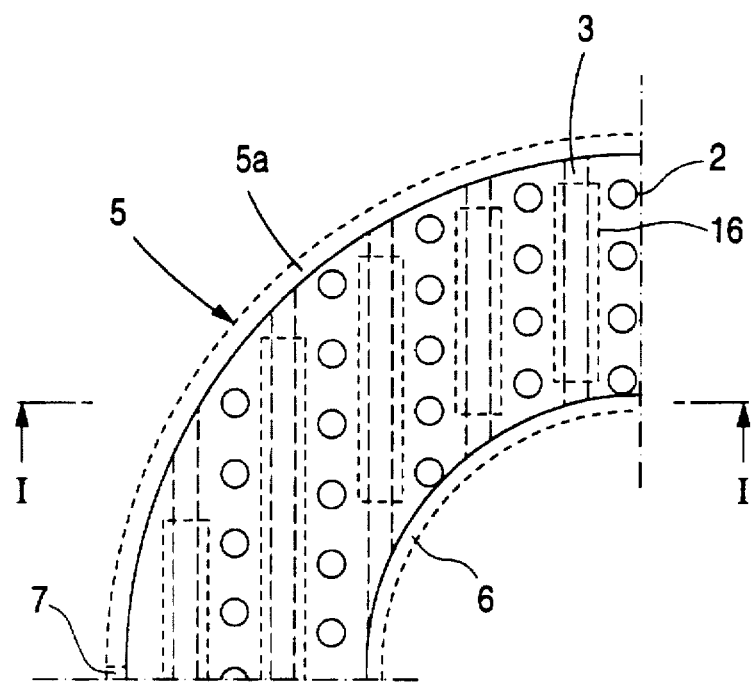
FIG. 1A is a plan view showing a main part of a granulating die of an embodiment of the present invention.
Figure 1B:
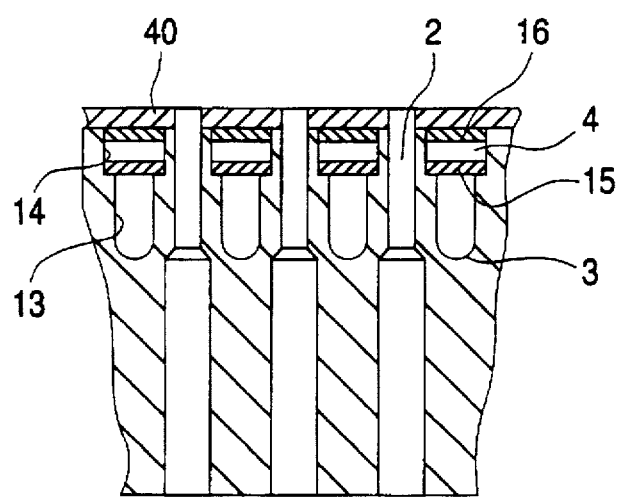
FIG. 1B is a sectional view taken along the line I—I in FIG. 1A.

In the granulating die 1 of this embodiment, vacuum heat insulating portions 4 are formed in the surface portion of the die 1 respectively adjacently to the heating jackets 3, as shown in FIG. 1. The procedure of producing such a granulating die 1 is as follows.

(1) Linear grooves 13 for forming heating jackets 3 are formed from the surface of a mother material of the granulating die 1.

(2) Linear grooves 14 for forming vacuum heat insulating portions 4 are formed in the upper portions of the linear grooves 13 respectively.

(3) Filler metals 15 are put in the linear grooves 13 while heating fluid paths are secured, and the filler metals 15 are welded to form heating jackets 3.

(4) Filler metals 16 are put in the linear grooves 14 respectively while gaps of 0.5 to 1.0 mm are secured for vacuum portions.

(5) The die is put in a vacuum chamber and the vacuum chamber is evacuated to a high vacuum of not higher than $5 \times 10^{-3}$ torr.

(6) While this state is kept, the filler metals 16 are electron-beam-welded to the mother material of the granulating die 1 to form the vacuum heat insulating portions 4.

(7) Then, a curing layer 40 is provided on the surface of the mother material of the granulating die 1 and nozzle holes 2 are formed between the heating jackets 3 and the vacuum heat insulating portions 4.

In this manner, the vacuum heat insulating portions 4 of the granulating die 1 can be formed easily by using electron beam welding. Alternatively, the heating jackets 3 may be formed by making holes by a drill, or the like.

The operation of the aforementioned embodiment will be described below.

A heating fluid supplied from the inlet path 8 passes through the heating jackets 3 formed in the left and right of the rows of nozzle holes 2 and the inner annular path 6 (partly passes through only the heating jackets) via one portion 5a of the outer annular path 5 and is discharged from the outlet path 9 via the other portion 5b of the outer annular path 5. On the other hand, melted resin fed from the extruder 30 passes through the die holder 31 to be extruded into the circulator box 33 from the granulating die 1. The extruded melted resin is cooled and then solidified immediately by circulation of water and, at the same time, cut into a moderate length by the cutter edges 34 to form pellets 37. The pellets 37 are carried by the circulating water to the pellet dewatering/drying device (not shown).

Although the surface of the granulating die 1 is cooled by the circulating water because the surface of the granulating die 1 is in contact with the circulating water, cooling is cut off because the vacuum heat insulating portions 4 are formed in the surface of the granulating die 1 adjacently to the heating jackets 3 respectively. Accordingly, the land portions 38 and tapered portions 39 of the nozzle holes 2 can be heated sufficiently by the heating fluid which passes through the heating jackets 3. Accordingly, the melted resin can be prevented from being solidified in the nozzle holes 2. That is, by provision of the vacuum heat insulating portions 4 in the surface of the granulating die 1, not only the heat insulating effect is improved remarkably compared with the conventional heat insulating member but also reliability is improved compared with the case where a heat insulating member of a material different from the mother material of the granulating die 1 is joined to the mother material of the granulating die 1.

According to the present invention, the vacuum heat insulating portions are formed in the upper portions of the jackets in the granulating die to prevent the nozzle holes from being cooled excessively by circulating water. As a result, choking of the nozzle holes is eliminated, so that good pellets can be obtained.

What is claimed is:

1. A granulating die for synthetic resin, comprising:
    a plurality of nozzle holes formed in rows;
    a plurality of heating jackets each arranged between the rows; and
    a plurality of vacuum heat insulating portions formed on a surface of the granulating die, each of the vacuum heat insulating portions being arranged adjacently to one of the heating jackets.

2. The granulating die of claim 1, wherein each of the heating jackets is arranged linearly to the respective vacuum heat insulating portions.

3. An underwater granulator for synthetic resin, comprising a granulating die comprising:
    a plurality of nozzle holes formed in rows;
    a plurality of heating jackets each arranged between the rows; and
    a plurality of vacuum heat insulating portions formed on a surface of the granulating die, each of the vacuum heat insulating portions being arranged adjacently to one of the heating jackets.

4. The underwater granulator of claim 3, wherein each of the heating jackets is arranged linearly to the respective vacuum heat insulating portions.

* * * * *